United States Patent [19]

Orlandi

[11] Patent Number: 5,094,258
[45] Date of Patent: Mar. 10, 1992

[54] SCREW TYPE VALVE WITH CERAMIC DISKS

[75] Inventor: Alessio Orlandi, Mantova, Italy

[73] Assignee: Galatron S.r.l., Via Artigianato, Italy

[21] Appl. No.: 605,946

[22] Filed: Oct. 30, 1990

[30] Foreign Application Priority Data

Nov. 8, 1989 [IT] Italy ................... 5228 A/89

[51] Int. Cl.⁵ ................... F16K 3/02; F16K 25/00
[52] U.S. Cl. ................... 137/454.5; 137/625.31; 251/208; 251/288; 251/304
[58] Field of Search ............ 137/315, 454.2, 454.5, 137/454.6, 625.31; 251/205, 208, 288, 304, 310, 314

[56] References Cited

U.S. PATENT DOCUMENTS

| | | | |
|---|---|---|---|
| 3,780,758 | 12/1973 | De Vries | 137/454.6 |
| 3,807,455 | 4/1974 | Farrell | 137/454.6 |
| 3,831,621 | 8/1974 | Anthony et al. | 137/454.6 |
| 3,834,416 | 9/1974 | Parkison | 251/304 |
| 4,005,728 | 2/1977 | Thorp | 137/454.6 |
| 4,331,176 | 5/1982 | Parkison | 137/454.5 |
| 4,651,770 | 3/1987 | Denham et al. | 137/625.31 |
| 4,821,765 | 4/1989 | Iqbal et al. | 137/454.5 |
| 4,896,693 | 1/1990 | Rodriguez | 137/454.5 |
| 4,899,982 | 2/1990 | Lange | 251/214 |

FOREIGN PATENT DOCUMENTS

| | | |
|---|---|---|
| 3031371 | 2/1982 | Fed. Rep. of Germany ................... 137/625.31 |
| 3519583 | 3/1986 | Fed. Rep. of Germany ...... 251/304 |

Primary Examiner—George L. Walton
Attorney, Agent, or Firm—McGlew & Tuttle

[57] ABSTRACT

A screw type valve for the delivery of water in hydrosanitary installations with superimposed ceramic sealing disks, a fixed one (13) and a rotating one (15). The valve also comprises a sleeve (11) fitted into an externally threaded ring (10) and with a bottom ring (12) bearing the fixed ceramic disk (13), a driving spindle (14) with said movable ceramic disk (15) on its bottom rotating inside said sleeve, while on its top end a control handle is fitted, said sleeve, ring and spindle being made of a plastic material, while the threaded ring is made of metal to allow a safe installation of the valve.

4 Claims, 2 Drawing Sheets

SCREW TYPE VALVE WITH CERAMIC DISKS

SPECIFICATION OF THE INVENTION

The present invention concerns a so-called screw type valve with ceramic sealing disks to control the delivery of water through the taps mounted in hydrosanitary installations.

At present a screw type valve is known, which comprises, inside a hollow cylindrical body to screw on the body of a tap, in line with the water supply pipe: a first ceramic washer fixed into the body by means of a disk bearing ring and having at least one hole allowing the passage of the water; a second ceramic disk on top of the first one, its hole being displaceable to and fro the hole in the first disk by its angular rotation; a driver rotating inside the hollow cylinder being keyed on the second disk; and a control spindle keyed on said driver and fitted with a handle to control the second disk, both the cylindrical body and the driver presenting radial passages for the water flowing through the holes in said disks towards the tap outlet. This kind of valve is first assembled as such, fitted with its bottom and lateral seals and then screwed, into the body of the tap. However, according to the prior state of art, said valve is composed of, obviously save the ceramic disks and the seals, all metal components, usually made of machined brass. This feature, as well as its assemblage heavily bear on its production costs as well as on the maintenance costs of the installed valve.

It is instead the object of this invention to propose a screw type valve mainly consisting of non-metallic components and in particular of injection moulded plastic pieces. It is a new solution of the problem put by the construction of this kind of valves having the advantage to drastically reduce machining and the required times for its execution, to simplify the realization of its components, some of which may form an integral unit and also to achieve an easier assembly of its components.

Another object of the invention is to propose a screw type valve in which the only metallic item is an externally threaded ring ensuring a safe and lasting fitting of the valve and designed to receive the other components, which will thus be easily and quickly replaceable in case they wear out or for maintenance. In addition, the use of components made of plastic material offers the advantage to drastically reduce furring inside the valve and the possibility to shape them exactly as it is required for their easy assemblage and for a free flow of the water.

To this end, the present invention proposes a screw type valve with a metal supporting ring attaching the valve to a valve body which is in turn attached to a water conduit. An intermediate sleeve fits into the supporting ring in a non-rotatable manner. The intermediate sleeve has lateral slots for water to flow from the inside of the sleeve to the outside. Inside the intermediate sleeve is a contreol spindle. One end of the control spindle having a movable ceramic disk and the other end of the control spindle being attached to a control handle. The movable ceramic disk having passages allowing the water to flow. A fixed ring is attached to the intermediate sleeve and surrounds the control spindle. The fixed ring contains a fixed ceramic disk which is superimposed on the movable ceramic disk. The fixed ceramic disk also having passages for the flow of water. Rotation of the control spindle moves said movable disk for opening and closing the passages of said ceramic disk. The intermediate sleeve, the control spindle and the fixed ring are all made of plastic.

The present invention is not just a valve made with components of a material which is different from those used according to the prior state of art, but said components made of nonmetallic materials are also shaped to a different structure so as to achieve a functional and reliable assemblage of the whole valve itself.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
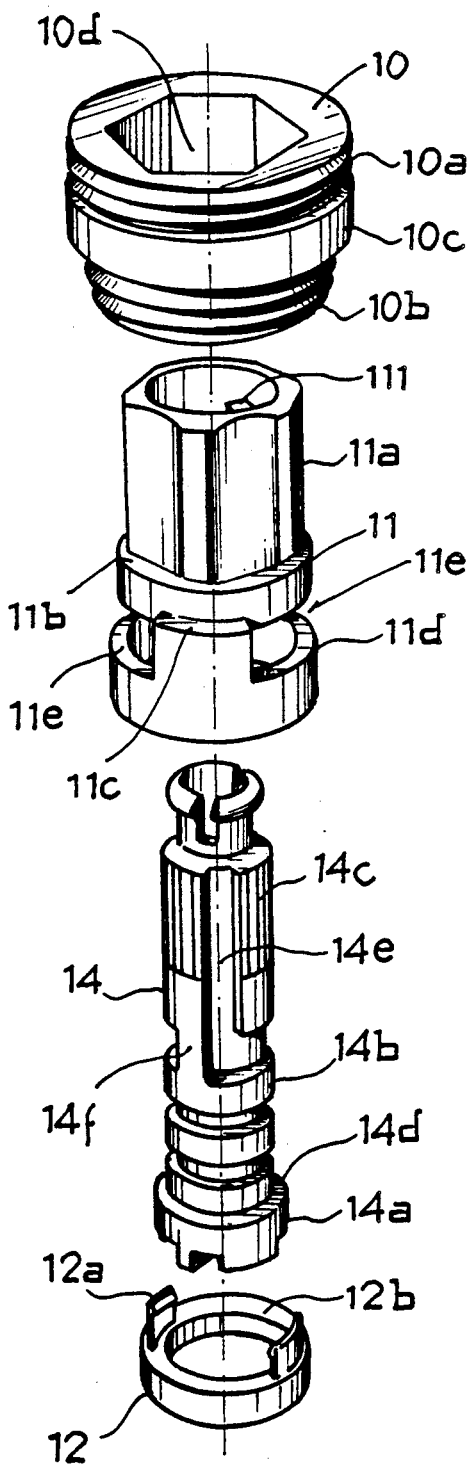
FIG. 1 shows a perspective view of the valve components made of metal and plastic material.
Figure 2:
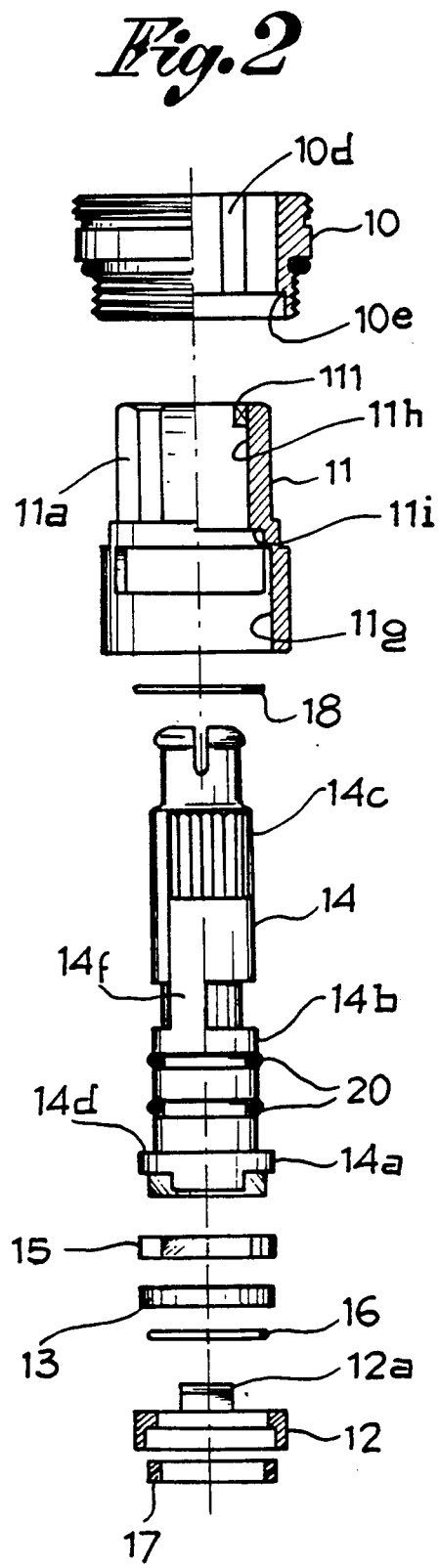
FIG. 2 shows an exploded view of all components of the valve.

The proposed screw type valve substantially comprises a supporting ring 10, an intermediate sleeve 11 keyed into said ring 10, a fixed ring 12 enclosing a fixed ceramic disk 13 and fitted to its bottom end and a control spindle 14 guided and rotating inside said sleeve 11, a second ceramic disk 15 being fitted to its bottom end and rotating on top of said mixed disk 13. The supporting ring 10 is made of metal, e.g. of brass, while the intermediate sleeve 11, ring 12 and control spindle 14 are made of a suitable plastic material.

More in particular, the outer surface of ring 10 has two threaded zones 10a, 10b separated by a plain collar 10c and its axial boring 10d is polygonal, e.g. hexagonal, with an annular step 10e defining its bottom end.

The outer surface 11a of the intermediate sleeve 11 is shaped to a polygon corresponding to the boring in ring 10 so as to fit into said ring without any possibility to rotate inside it. On the bottom end of the polygonal surface 11a of sleeve 11 an annular shoulder 11e is made available to receive step 10e inside ring 10 and a projection 11c may be provided to engage the bottom end of ring 10. The upper portion of sleeve 11 is protruding from ring 10 for an easy assembly of the valve by screwing it on the outer threading 10b of the metal ring 10.

Into the cylindrial bottom section 11d of sleeve 11 radial slots 11e are bored to allow the outflow of water. Towards its free end said cylindrial section 11d also presents slots 11f to snap in ring 12. To this purpose said ring 12 is fitted with toothed tongues 12a fitting into said slots 11f of sleeve 11. Inside ring 12 an annular projection 12b provides a top surface receiving the fixed disk 13 with the interposition of a sealing 16, and a bottom surface receiving an end sealing 17.

Inside the interemediate sleeve 11 its cylindrical section 11d with slots 11e encloses a seat 11g, while its polygonal top section 11a encloses a seat 11h, with a stop face 11i between said two seats.

A control spindle 14 rotating inside sleeve 11 is composed of a bottom plate 14a fitted into seat 11g, a cylindrical intermediate portion 14b fitted into the upper seat 11h and an upper end 14c protruding from sleeve 11. Between said bottom plate 14a and the intermediate portion 14b a step 14d is abuting on the stop surface 11j between seats 11g and 11h after interposing an antifriction ring 18.

On the bottom plate 14a of the spindle the movable ceramic disk 15 is keyed, either with or without an interposed sealing, said disk presenting lateral holes 15d at the level of the radial slots 11e in sleeve 11. The intermediate part of spindle 14 is fitted into seat 11h after inserting seals 20 and presenting at least one groove 14e into which at least one tooth 111 inside sleeve 11 is extending, said tooth interacting with a stop face 14f in said groove in order to define the swing angle of spindle 104. The construction of the whole unit is designed in such a way that the swing angle of the control spindle 14 is defined both to the right and to the left. Finally, the top end 14c of spindle 14 is broached and fitted with the means required to assemble a (not represented) control handle, which may be screwed on said spindle top end.

To assemble to the valve the spindle 14 is pushed upwards into sleeve 11 and the ceramic disk 15 keyed on the bottom plate 14a; then the ring 12 with the fixed disk 13 is slipped on sleeve 11. Now the whole unit is interduced into the metal ring 10 by pushing it upwards and completed with the bottom sealing ring 17.

Figure 3:
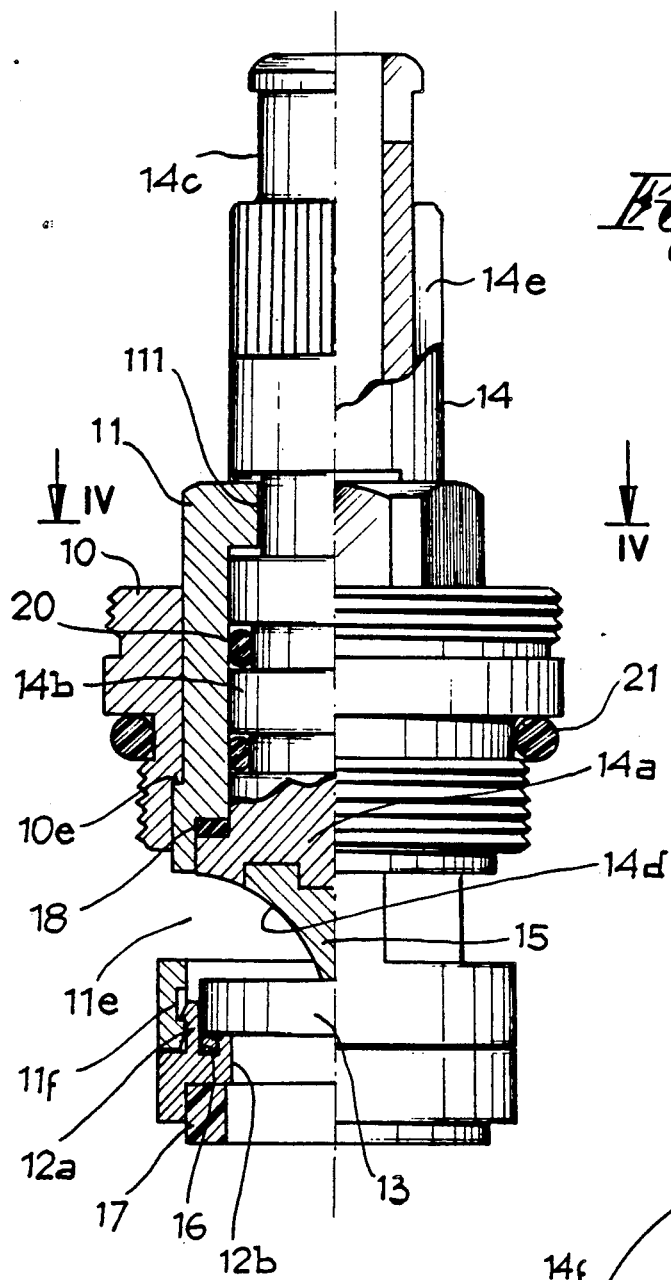
FIG. 3 shows a partially sectioned axial view of the assembled valve.
Figure 4:
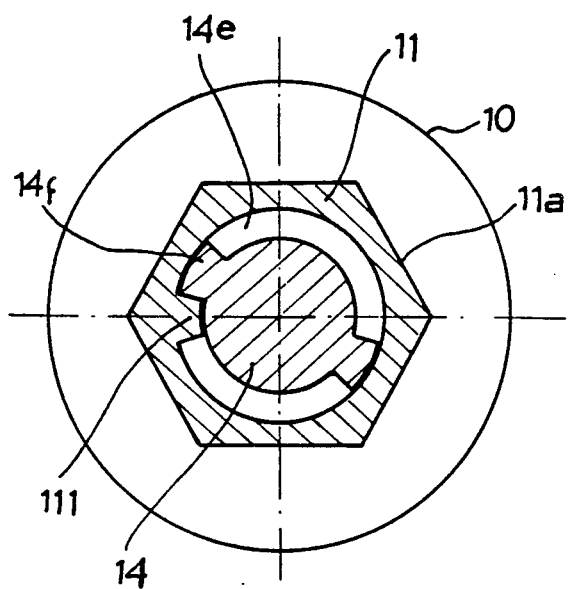
FIG. 4 shows a transversal section obtained along the line between arrows IV-IV in FIG. 3.

The assembled valve is shown in FIG. 3 of the enclosed drawing. Now, after fitting ring 10 with an outer sealing 21, the valve can be installed by acting on the polygonal upper portion of the sleeve to screw the threaded section 10b of ring 10 into the body of a (not represented) tap connected with a water conduit. By partially or totally superimposing the holes or passages in the ceramic disks 13, 15 a water flow is obtained through the radial slots in the sleeve, while by taking the lateral passages of the movable disk away from those of the fixed one the valve is closed.

While a specific embodiment of the invention has been shown and described in detail to illustrate the application of the principles of the invention, it will be understood that the invention may be embodied otherwise without departing from such principles.

I claim:

1. A screw type valve comprising:
   a valve housing;
   a supporting ring with outer threads, said supporting ring being made of metal and defining a polygonal axis boring;
   an intermediate sleeve made of plastic fixed non-rotatably in said supporting ring, said intermediate sleeve defining lateral slots for a flow of fluid and said intermediate sleeve having a polygonal outer surface complimentary to said polygonal axle boring of said supporting ring, said supporting ring fitting over and around said polygonal outer surface of said intermediate sleeve for preventing rotation of said intermediate sleeve with respect to said supporting ring, said supporting ring fitting against an annular shoulder of said intermediate sleeve, said intermediate sleeve having a top portion of said polygonal outer surface protruding through and above said supporting ring, said top portion of said polygonal outer surface graspable for screwing and unscrewing said supporting ring and said intermediate sleeve as a single unit into and out of said valve housing;
   a control spindle made of plastic, and guided and rotating inside said intermediate sleeve, said control spindle fitted on one end with a movable ceramic disk, said movable ceramic disk defining passages for said flow;
   a fixed ring made of plastic and fitted onto said intermediate sleeve and surrounding said control spindle, said fixed ring enclosing a fixed ceramic disk, said fixed ceramic disk defining passages for said flow and said fixed ceramic disk superimposed with said movable ceramic disk for opening and closing said passages of said ceramic disks by said rotating of said control spindle; and
   a control handle fitted to said control splindle for controlling said rotating of said control spindle.

2. A valve in accordance with claim 1, wherein:
   said intermediate sleeve has two external abutting faces;
   said supporting ring having internal faces cooperating with said two external abutting faces of said intermediate sleeve for axle coupling of said intermediate sleeve and said supporting ring.

3. A valve in accordance with claim 1, wherein:
   said intermediate sleeve has a first cylindrical seat at said lateral slots and a second cylindrical seat at said polygonal outer surface;
   said control spindle has a plate fitting into said first cylindrical seat and said control spindle has an intermediate portion being fitted by interposing one or more seals into said second cylindrical seat;
   said intermediate seat having means for receiprocal axial fixation.

4. A valve in accordance with claim 1, wherein:
   said intermediate sleeve has a tooth; and
   said control spindle has an abutment which interacts with said tooth.

* * * * *